United States Patent [19]

Kanno et al.

[11] Patent Number: 5,025,339
[45] Date of Patent: Jun. 18, 1991

[54] DISK DRIVE APPARATUS WITH OIL DAMPER ON EJECT LEVER

[75] Inventors: Tetsuo Kanno, Ebina; Yasushi Kotake, Machida; Hitoshi Inada, Atsugi, all of Japan

[73] Assignee: Ricoh Company, Ltd., Tokyo, Japan

[21] Appl. No.: 511,987

[22] Filed: Apr. 13, 1990

Related U.S. Application Data

[62] Division of Ser. No. 310,476, Feb. 13, 1989, abandoned, which is a division of Ser. No. 47,853, May 8, 1987, abandoned.

[30] Foreign Application Priority Data

May 9, 1986 [JP] Japan .................... 61-105887

[51] Int. Cl.$^5$ .......................... G11B 17/04
[52] U.S. Cl. .................. 360/99.06; 360/99.02
[58] Field of Search ........... 360/97.01, 99.01, 99.02, 360/99.03, 99.06, 99.07

[56] References Cited

U.S. PATENT DOCUMENTS

| 4,107,747 | 8/1978 | Kumaki | 360/93 |
| 4,539,613 | 9/1985 | Suyama et al. | 360/99 |
| 4,587,585 | 5/1986 | Shimoaka et al. | 360/99.06 |
| 4,656,542 | 4/1987 | Shibata | 360/99 X |
| 4,685,010 | 8/1987 | Tronzano | 360/97 |
| 4,692,916 | 9/1987 | Rouws | 360/270 |
| 4,716,477 | 12/1987 | Uehara | 360/97 |
| 4,717,976 | 1/1988 | Nishimura et al. | 360/97 |
| 4,777,551 | 10/1988 | Seki et al. | 360/104 |

FOREIGN PATENT DOCUMENTS

| 0102370 | 6/1983 | Japan | 360/97 |
| 0211305 | 12/1983 | Japan | 360/97 |
| 0217266 | 12/1984 | Japan | 360/97 |
| 0163291 | 8/1985 | Japan | 360/97 |
| 0080562 | 4/1986 | Japan | 360/97 |
| 0224172 | 10/1986 | Japan | 360/99.06 |

Primary Examiner—David J. Severin
Attorney, Agent, or Firm—Cooper & Dunham

[57] ABSTRACT

An optical disk drive apparatus includes a tray into which an optical disk or a cartridge housing therein an optical disk may be inserted. The tray is movable first in a horizontal direction and then in a vertical direction. A cone arm having a cone disk rotatably supported at its distal end is provided and the proximal end is fixedly supported near the entrance of the apparatus where an insertion slot for inserting an optical disk or cartridge is located. The cone arm is flexible and elongated in shape and has its intermediate portion operatively coupled to a bracket fixedly mounted on the tray, so that as the tray moves horizontally and then vertically, the cone arm is automatically deflected to bring the cone disk in engagement with the optical disk, thereby causing the optical disk properly mounted on a spindle motor. Further, an oil damper is interconnected with both a loading/ejecting arm and a shutter opening and closing member.

4 Claims, 11 Drawing Sheets

DISK DRIVE APPARATUS WITH OIL DAMPER ON EJECT LEVER

This is a division of application Ser. No. 07/310,476, filed Feb. 13, 1989, which is a division of Ser. No. 07/047,853 filed on May 8, 1987, both abandoned.

BACKGROUND OF THE INVENTION

1. Field of the Invention

This invention generally relates to a memory storage apparatus for storing information on a memory medium, and, in particular, to a disk drive apparatus for storing information on a memory disk, such as an optical disk or magnetic disk.

2. Description of the Prior Art

A disk drive for storing information on a disk is well known in the art, for example, for use as an external memory of a computer system. Typical prior art disk drive apparatuses are schematically illustrated in FIG. 22 and FIGS. 23a and 23b. In these prior art disk drive apparatuses, a disk or a cartridge housing therein a disk is inserted into a tray of a loading unit 1 horizontally in the direction indicated by the arrow, and, as guided by a pair of L-shaped guide grooves 3 and 4, the tray 2 is first moved in the horizontal direction (disk insertion direction) to be located above a spindle motor, which is not shown, and, then, the tray 2 is moved downward in the vertical direction (perpendicular to the disk insertion direction), thereby causing the disk to be mounted on the spindle motor so as to be rotatably supported. In this type of disk drive apparatus, as shown in FIG. 22, when the disk is mounted on the spindle motor, which is not shown, a cone arm 5 is operated by a separately provided motor, thereby causing the cone arm 5 to pivot around a proximal end a thereof and a pressure cone 6 provided at the distal end of the cone arm 5 to hold the disk thus mounted on the spindle motor in Moreover, in this type of the prior art disk drive apparatus, for example, as shown in FIG. 23a, it is so structured that a tension spring 7 is provided to bias the cone arm 5, which is pivotally supported at its proximal end a, to abut against the forward end b of the tray 1. And, as shown in FIG. 23b, when the tray 1 is moved downward to have the disk mounted on the spindle motor, the tray 1 is separated away from the cone arm 5 and the pressure cone 6 provided at the distal end of the cone arm 5 comes to hold the disk against the spindle motor under the force of the spring 7. However, in the case of the disk drive apparatus shown in FIG. 22, there is a problem of necessity to provide a separate motor. On the other hand, in the case of the disk drive apparatus shown in FIGS. 23a and 23b, since the distance 1 between points a and b is relatively short, the load applied to the tray 2 becomes large when the tray 2 is to be moved upward, and there is also a problem of incapability to utilize the movement of the tray 2 in the horizontal direction for vertical movement of the cone arm 5. Besides, in such a prior art structure, the stroke of movement of the pressure cone 5 is relatively large, so that this fact tends to hinder to make the entire disk drive apparatus compact in size.

Furthermore, in the prior art apparatus as shown in FIGS. 22 and 23, it is so structured that, after inserting a disk or a cartridge housing therein a disk into the tray 2 of the loading unit 2, an eject member mounted on the tray 2 is set in a latched condition so as to prevent the disk or cartridge from being undesirably ejected. Thereafter, the tray 2 is moved as guided by the L-shaped guide grooves 3 and 4. That is, in the first place, the tray 2 is moved horizontally to be located above a spindle motor, which is not shown, and then moved vertically downward to have the disk mounted on the spindle motor. In such a prior art structure, however, it is so structured that the cartridge becomes unlatched by its vertical downward movement, so that the cartridge tends to be ejected and thus encounters difficulty in entering into reference pins for positioning.

In addition, in a typical prior art disk drive apparatus as shown in FIG. 24, when a cartridge 1 housing therein a disk is inserted, an eject lever 3 biased by an eject spring 3 comes into engagement with a shutter provided on the cartridge 1, and as the cartridge 1 is further inserted, the eject lever 3 is pivotally moved clockwise under the force of the eject spring 2, whereby the shutter 4 in engagement with the tip end of the eject lever 3 is moved upward to open the cartridge 1. And, when the cartridge 1 has been completely inserted, the eject lever 3 is held in the position indicated by the one-dotted line by means of a latch mechanism (not shown) so that a head window of the cartridge 1 is opened, thereby allowing access to the disk housed in the cartridge 1 so as to carry out a reading and/or writing operation to the disk. Upon completion of such a reading and/or writing operation, the latch is released so that the cartridge 1 is ejected by the action of the eject lever 3 and the head window 5 of the cartridge 1 becomes closed by the shutter 4.

However, when the opening and closing operation of the shutter 4 and the ejection of the cartridge 1 are carried out by the single eject lever 3, the distance of ejection of the cartridge 1 by the eject lever 3 tends to be excessive so as to secure a sufficient opening and closing stroke of the shutter 4. If the biasing force of the eject spring 2 is lowered, then there is produced another problem of fluctuations in the ejection position of the cartridge 1.

SUMMARY OF THE INVENTION

In accordance with one embodiment of the present invention, there is provided a disk holding mechanism for use in a disk drive apparatus of the type in which a disk or a cartridge housing there in a disk is inserted in a tray which is then first moved in a first predetermined direction (typically horizontal direction) to be located above a spindle motor and then in a second predetermined direction (typically vertically downward direction) to have the disk mounted on the spindle motor, thereby causing the disk to be rotatably supported, wherein there is provided a cone arm which extends in the direction of insertion of the disk and which has its proximal end fixedly attached at the insertion side and its intermediate portion coupled to the tray so as to allow the cone arm to pivot around the proximal end by the movement of the tray, whereby a cone (pressure) disk mounted at the distal end of the cone arm comes to hold the disk against the spindle motor resiliently under pressure. When the disk is set to the spindle motor, the cone arm pivots around the proximal end thereof to come down along with the movement of the tray so that the disk is held in position under pressure by the cone disk.

In accordance with another embodiment of the present invention, there is provided an eject mechanism for use in a disk drive apparatus of the type in which a disk or a cartridge housing therein a disk, such as an optical disk, is inserted in a tray which is then first moved in a first predetermined direction (typically horizontal direction) to be located above a spindle motor and then in a second predetermined direction (typically vertically downward direction) to have the disk mounted on the spindle motor, thereby causing the disk to be rotatably supported, wherein the eject mechanism includes ejecting means, such as an eject arm, for urging the disk or the cartridge to be ejected, latching means for latching said ejecting means when the tray, in which the disk or the cartridge has been inserted, has been moved to a first predetermined position, and releasing means, such as a leaf spring, for releasing the latching condition of said latching means when the tray has been moved to a second predetermined position so as to have the disk or the cartridge ejected.

In accordance with a further embodiment of the present invention, there is provided a disk drive apparatus of the type in which when a cartridge housing therein a disk has been inserted, a shutter of the cartridge is moved to its open position, thereby permitting access to the disk housed in the cartridge through a head window which has been opened by the shutter for writing or reading operation, wherein a shutter open lever for opening the shutter and an eject lever for ejecting the cartridge are separately provided.

In accordance with a still further embodiment of the present invention, there is provided a disk drive apparatus comprising a chassis unit which includes such elements as a spindle motor for driving to rotate a disk, an optical pick-up and a seek motor for moving the optical pick-up in the radial direction of the disk, a loading unit provided above the chassis unit for implementing insertion and ejection of the disk, a loading driving system and a power supply unit disposed below the loading unit and lateral of the chassis unit, a drive control board disposed above the loading unit, a tray housing therein a disk or a cartridge housing therein a disk, said tray being inserted into said loading unit and being first moved in a first direction (typically horizontal direction) to be located above the spindle motor and then moved in a second direction (typically vertically downward direction) to have the disk mounted on the spindle motor, thereby setting the disk to be rotatably supported by the spindle motor, a cone arm extending in the direction of insertion of said disk, said cone arm having a proximal end which is fixed in position at the side of insertion of the disk and an intermediate portion coupled to said tray, thereby allowing said cone arm to pivotally move around said proximal end due to the movement of said tray, and a cone disk mounted at a distal end of said cone arm, said cone disk causing said disk to be resiliently pressed against said spindle motor, whereby a relief hole for said cone arm is formed in said drive control board. With this structure, when the disk is set in position to the spindle motor, the cone arm is pivotally moved around the proximal end thereof to have its distal end lowered along with the insertion of the tray, whereby the disk is held in position resiliently under pressure by the cone disk.

It is therefore a primary object of the present invention to obviate the disadvantages of the prior art as described above and to provide an improved disk drive apparatus.

Another object of the present invention is to provide a disk drive apparatus having an improved disk holding mechanism.

A further object of the present invention is to provide a disk drive apparatus having an improved disk eject mechanism.

A still further object of the present invention is to provide an improved disk drive apparatus simple in structure, fewer in the number of parts and lower at cost.

A still further object of the present invention is to provide an improved disk drive apparatus high in performance and reliable in operation.

Other objects, advantages and novel features of the present invention will become apparent from the following detailed description of the invention when considered in conjunction with the accompanying drawings.

BRIEF DESCRIPTION OF THE DRAWINGS

FIG. 15b is a schematic illustration showing in a side elevational view the structure shown in FIG. 15a;

DESCRIPTION OF THE PREFERRED EMBODIMENTS

Figure 16:
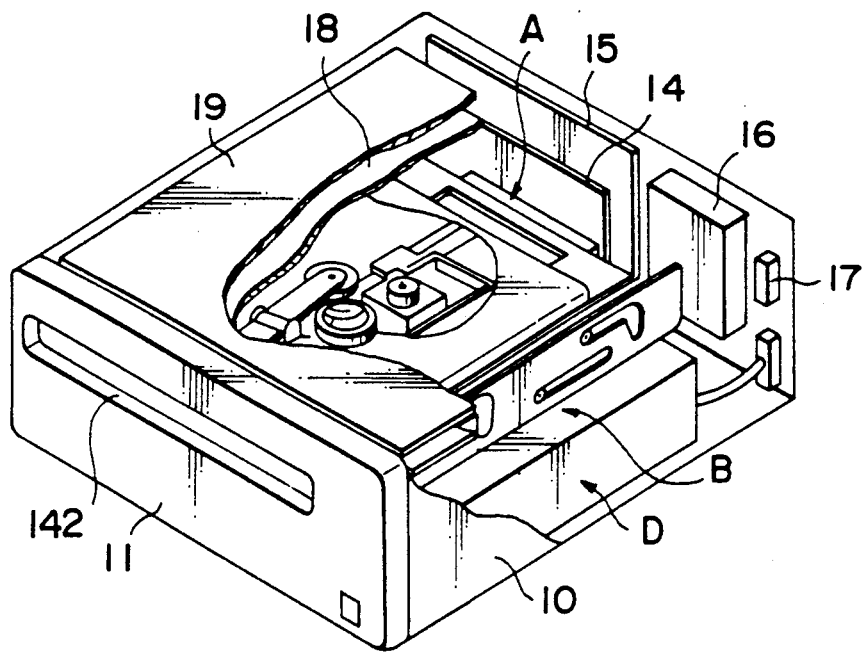
FIG. 16 is a perspective, partly cut-away view showing the overall structure of the present optical disk drive apparatus constructed in accordance with one embodiment of the present invention.
Figure 17:
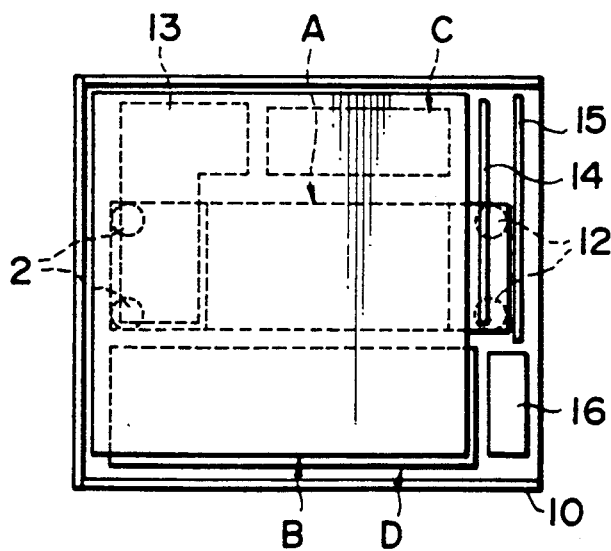
FIG. 17 is a schematic, plan view of the structure shown in FIG. 16.
Figure 18:
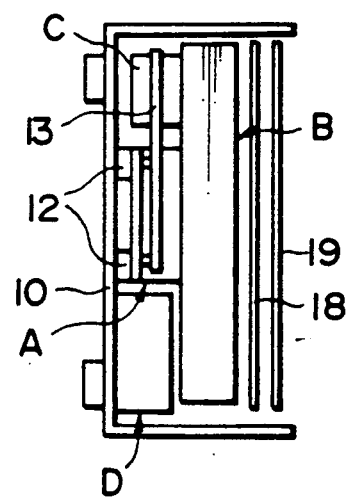
FIG. 18 is a schematic, side elevational view of the structure shown in FIG. 16.

Referring first to FIGS. 16 through 18, there is schematically shown an optical disk drive apparatus constructed in accordance with one embodiment of the present invention. As shown, the present optical disk drive apparatus includes a case frame 10, at a front surface of which is mounted a front panel 11. A chassis unit or assembly A is disposed at the center of this case frame 10 as supported by four anti-vibration rubber members 12. Above the chassis unit A is disposed a loading unit or assembly B which is much larger in width than the chassis unit A and which takes care of insertion and ejection of an optical disk. At one side of the chassis unit A and below the loading unit B is disposed a load drive system C for driving the loading unit B. At the side opposite to the side where the load drive system C is disposed is a power supply unit D elongated in shape for converting an a.c. voltage into a d.c. voltage.

Moreover, as also shown in FIGS. 16 through 18, a spindle control board 13 is horizontally provided integrally with the chassis unit A as extending over the front end portion of the chassis unit A and also over the front end portion of the load drive system C. In addition, a mechanical interface board 14 for controlling later-described elements, such as an optical pick-up and a seek motor, is provided as vertically arranged, integral with the chassis unit A and extending near the end portions of the chassis unit A and the load drive unit C. An interface board 15 is also provided vertically adjacent to and at the outside of the chassis unit A integrally with the case frame 10. Near the end of the power supply unit D is disposed a fan motor 16 for limiting the temperature increase of the power supply, etc., and a cover open switch 17 is also provided. Above the loading unit B is disposed a pair of drive control boards 18 and 19 one on top of another with the lower drive control board being used as a control board within the drive apparatus and the upper drive control board being used as a control board between drive apparatuses (a control board common to a plurality of drive apparatuses, such as for error correction). With this structure, an alteration between a unit with a control and a unit without a control can be carried out simply.

FIGS. 1 through 15 show specific structures of the above-described optical disk drive apparatus. The structure of each of the chassis unit A, loading unit B and load drive system C of the present optical disk drive apparatus will be described in detail with reference to FIGS. 1 through 15.

Figure 1:
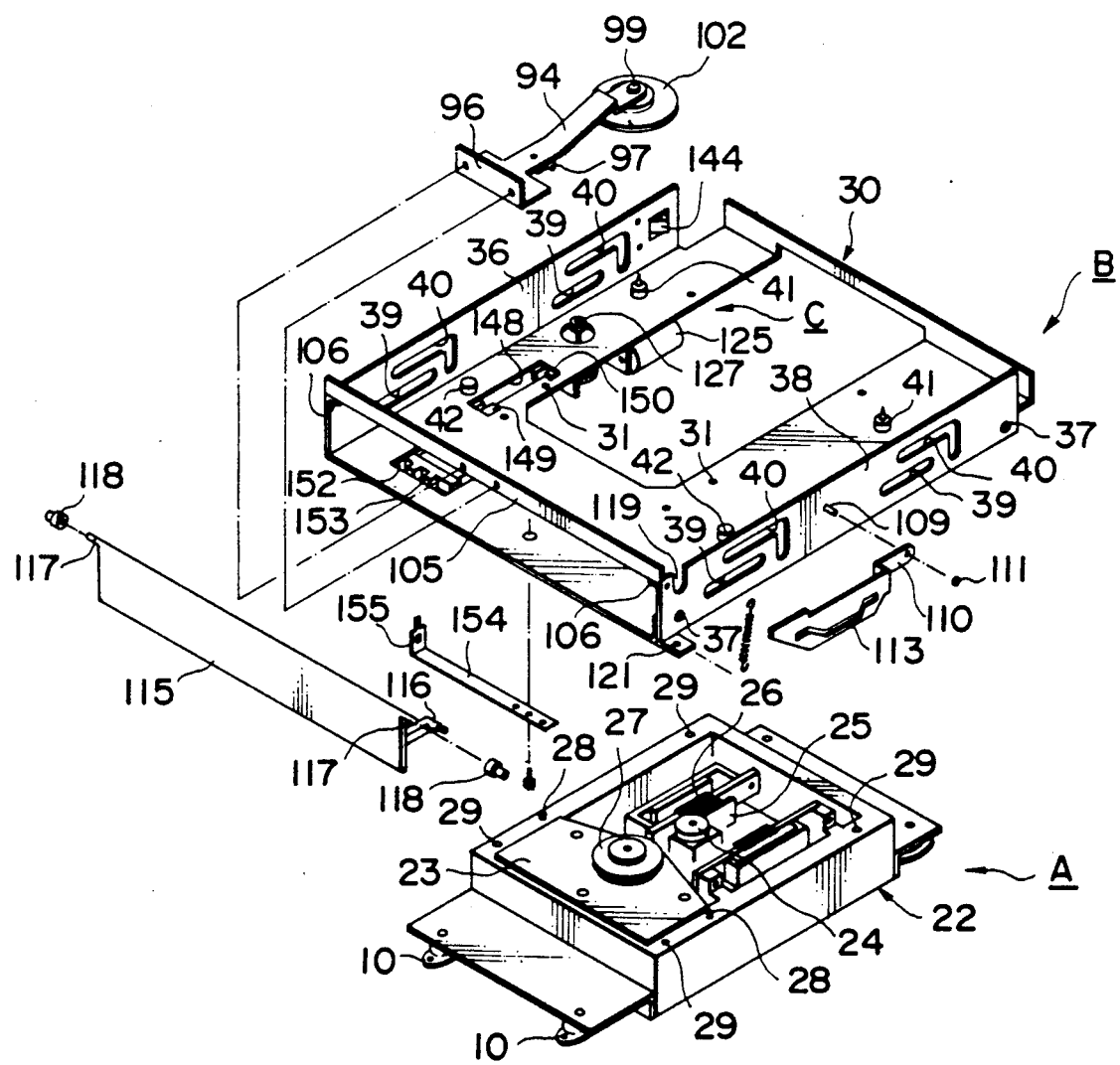
FIG. 1 is an exploded, schematic illustration showing several parts of an optical disk drive apparatus constructed in accordance with one embodiment of the present invention.
Figure 2:
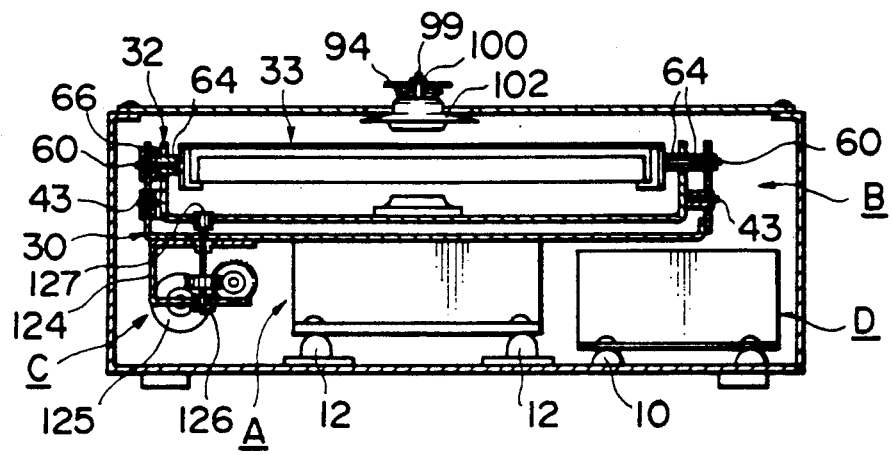
FIG. 2 is a schematic, partly cross sectional view showing the present optical disk drive apparatus.

As shown in FIG. 1, the chassis unit A includes a box-shaped chassis 22 in which a spindle motor 23 for rotating a later-described disk as mounted thereon, an optical pick-up 24 for writing information to and reading information from the disk in rotation by the spindle motor 23, a carriage 25 for mounting thereon the optical pick-up 24, and a seek motor 26 for moving the carriage 25 in the radial direction of the disk. And, the spindle motor 23 is provided with a spindle cap 27 for properly positioning the disk when the disk is mounted thereon. The chassis 22 is provided with a pair of positioning pins 28, 28 at opposite sides on the top surface thereof in a symmetrical arrangement, and four threaded holes 29 are provided at the top surface of the chassis 22. When assembled, the positioning pins 28, 28 are fitted into positioning holes 31, 31 provided in the frame 20 and screws extending through the frame 30 are screwed into the respective threaded holes 29 of the chassis 22, so that the loading unit B is fixedly attached to the top surface of the chassis unit A, as shown in FIG. 2. As may be understood from FIG. 2, the loading unit B includes the frame 30, a carrier 32 received in the frame 30, and a tray 33 received in the carrier 32.

As may be understood from FIG. 1, the frame 30 includes a left-hand side frame 36 which has been formed by bending one edge of the body of the frame 36 at right angles and a right-hand side frame 38 which has been formed by attaching an elongated plate similar in shape to the left-hand side frame 36 to the body of the frame 36 by means of screws 37, 37. Each of the side frames 36 and 38 is provided with a pair of straight slots 39 spaced apart from each other and a pair of L-shaped slots 40 each of which is located generally above the corresponding one of the straight slots 39. The corresponding straight and L-shaped slots 39 and 40 formed in the left-hand and right-hand side frames 36 and 38 are located opposite to each other. The bottom wall of the frame 30 located between the left-hand and right-hand side frames 36 and 38 is formed with a rectangular hole relatively large in size and provided with a pair of upstanding stepped reference pins 41, 41 and a pair of upstanding, unstepped reference pins 42, 42. When assembled, reference pins 43 and door arm drive pins 44 of the carrier 32 as shown in FIG. 3 are inserted into the respective straight slots 39, and the carrier 32 is supported to be horizontally movable within the frame 30, as shown in FIGS. 2 and 4.

Figure 3:
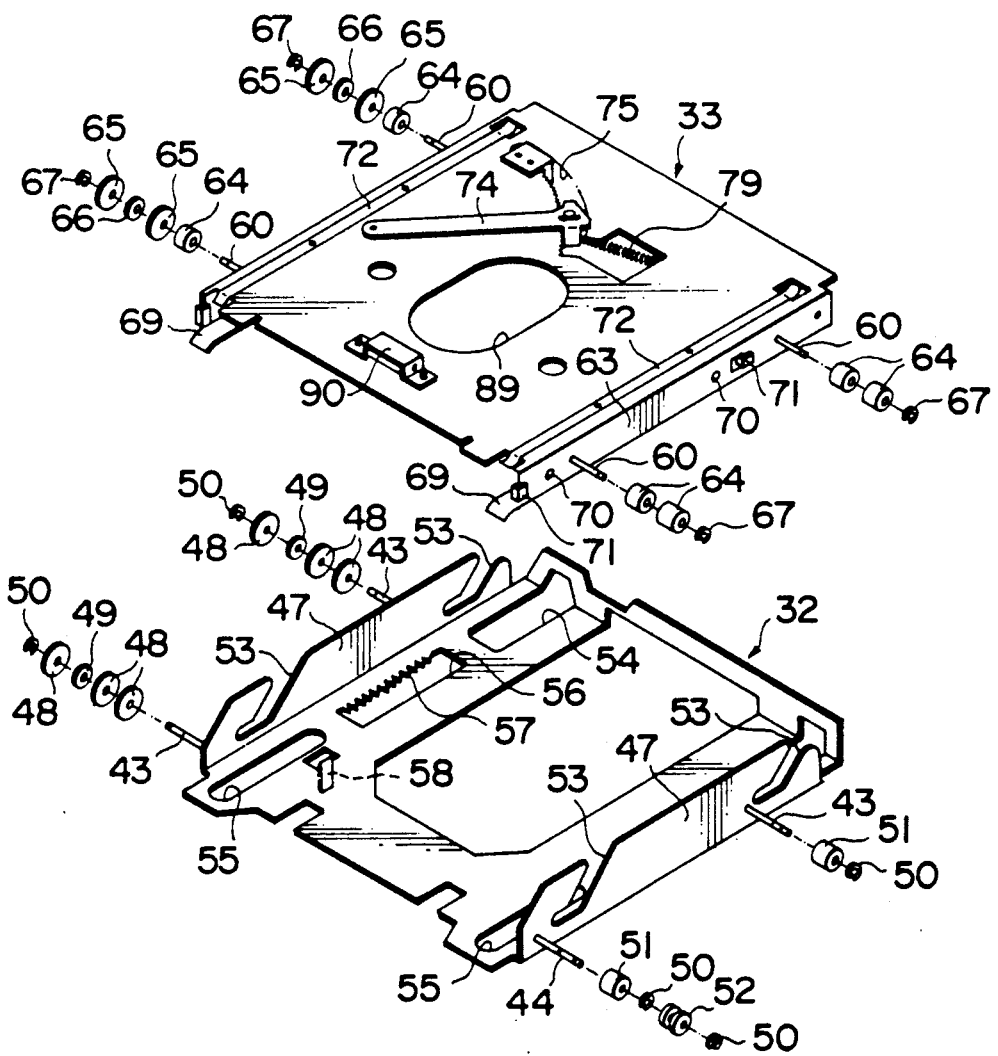
FIG. 3 is an exploded, schematic illustration showing the carrier and the tray provided in the present optical disk drive apparatus.
Figure 4:
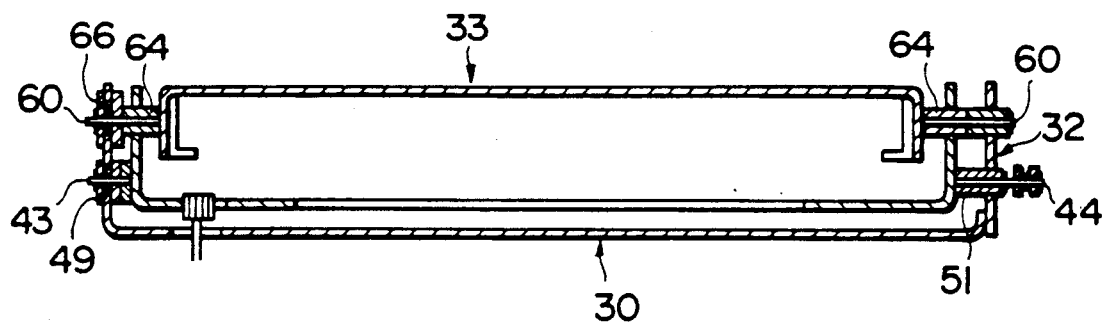
FIG. 4 is a schematic, cross sectional view showing the loading unit provided in the present optical disk drive apparatus.

As shown in FIG. 3, the carrier 32 of the loading unit B includes a pair of side portions 47, 47 which have been formed by bending both of the left-hand and right-hand edges upwardly at right angles, and the before-mentioned reference pins 43 and door arm drive pins 44 are provided to extend outwardly from the respective side portions 47, 47. The left-hand portion 47 is provided with a pair of reference pins 43, 43 to each of which is fitted onto a pair of large diameter thin collars 48, 48 and then a small diameter thin collar 49. And, then, the pins 43, 43 are fitted into the respective straight slots 39, 39 of the frame 30, whereby these small diameter thin collars 49, 49 are located inside of the respective straight slots 39, 39. Thereafter, large diameter thin collars 48, 48 are fitted onto the respective pins 43, 43, and, finally, E rings 50, 50 are fixedly attached to the respective pins 43, 43 at the end thereof.

On the other hand, the right-hand portion 47 is provided with a single reference pin 43 toward the rear end and a door arm drive pin 44 toward a front end, onto which are first fitted small diameter thick collars 51, 51, respectively, and then these pins 43 and 44 are fitted into the respective straight slots 39, 39 of the right-hand side frame 38 of the frame 30, whereby the small diameter thick collars 51, 51 are located within the respective straight slots 39, 39. And, finally, E rings 50, 50 are fixedly attached to the pins 43 and 44. The door arm drive pin 44 is longer than the reference pin 43 and a grooved collar 52 is additionally fitted onto the door arm drive pin 44 and another E ring 50 is fixedly attached to the end of the pin 44. And, as shown in FIGS. 2 and 4, the carrier 32 is supported within the frame 30 through the small diameter thin collars 49, 49 and the small diameter thick collars 51, 51 and the carrier 32 is horizontally movable rearwardly or forwardly, i.e., in a direction vertical to the plane of the drawing, as guided by the straight slots 39. It is to be noted that the large diameter thin collars 48 fitted onto the reference pins 43, 43 of the left-hand portion 47 are provided to remove any slack of the carrier 32 in the horizontal direction within the frame 30.

As shown in FIG. 3, each of the side portions 47, 47 of the carrier 32 is formed with a pair of inlined slots 53 generally in the shape of "J" which has its top end open, and the inlined slots 53 are arranged oppositely. The bottom wall of the carrier 32 extending between the opposite side portions 47, 47 is formed with a central opening relatively large in size and rectangular in shape, and the bottom wall is also formed with a pair of relief slots 54, 54 corresponding in position to the pair of stepped reference pins 41, 41 of the frame 30 and also with another pair of relief slots 55, 55 corresponding in position to the pair of unstepped reference pins 42, 42 of the frame 30. Also formed in the bottom wall of the carrier 32 is a rack opening 57 generally rectangular in shape and located between the relief slots 54 and 55 adjacent to the left-hand side portion 47, and a rack or serration 57 is formed along one side of the rack opening 56. In addition, adjacent to the relief slot 55 located at the left front corner of the bottom wall of the carrier 32 is provided a home end shutter 58 which is formed by partly cutting out the bottom wall of the carrier 32 and bending the cut-out portion downwardly at right angles. With this structure, the tray 33 is movably supported within the carrier 32 with the reference pins 60 of the tray 33 fitted into the respective inclined slots 53 of the carrier 32, as shown in FIGS. 2 and 4.

As also shown in FIG. 3, the tray 33 of the loading unit B has its left and right side edges bent downwardly at right angles to define a pair of left and right side portions 63, 63, each of which is provided with the before-mentioned reference pins 60 as extending outwardly. Onto each of the reference pins 60, 60 planted in the left side portion 63 of the tray 33 is fitted a small diameter thick (long) collar 64, and the reference pins 60, 60 are fitted into the respective inclined slots 53, 53 of the carrier 32 so as to have the small diameter thick collars 64, 64 located within the respective inclined slots 53, 53. Thereafter, a large diameter thin (short) collar 65 is fitted onto each of the reference pins 60, 60, and then a small diameter thin collar 66 is fitted onto each of the reference pins 60, 60. Under the condition, the reference pins 60, 60 are fitted into the respective L-shaped slots 40, 40 of the frame 30, thereby causing the small diameter thin collars 66, 66 to be located within the respective L-shaped slots 40, 40. Thereafter, a large diameter thin collar 65 is fitted onto each of the reference pins 60, 60 and then an E-ring 67 is fixedly attached to each of the reference pins 60, 60 at the end thereof.

On the other hand, onto each of the reference pins 60, 60 planted in the right-hand side portion 63 of the tray 33 is fitted a pair of small diameter thick collars 64, 64, and, then, the reference pins 60, 60 are fitted into the respective right-hand inclined slots 53, 53 of the carrier 32 and also into the respective right-hand L-shaped slots 40, 40 of the frame 30, thereby causing the pair of serially arranged collars 64, 64 to be located within the inclined and L-shaped slots 53, 40, respectively. Then, an E-ring 67 is fixedly attached to each of the reference pins 60 of the right-hand side portion 63 of the tray 33 at the end thereof. As shown in FIGS. 2 and 4, the tray 33 is supported within the carrier 32 and the frame 30 via the small diameter thick collars 64 and small diameter thin collars 66, and the tray 33 is supported to be movable in the shape of "L", i.e., horizontally over a first predetermined distance and then vertically over a second predetermined distance as guided by the L-shaped slots 40 and the inclined slots 53. It is to be noted that the large diameter thin collars 65 fitted onto the reference pins 60 of the left-hand side portion 63 are to remove any play or slack of the tray in the horizontal direction within the carrier 32.

Figure 5:
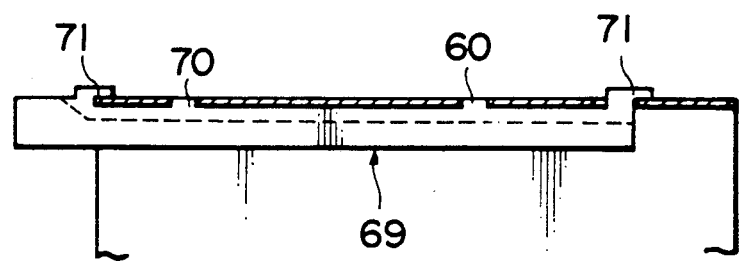
FIG. 5 is a schematic illustration showing part of the tray provided in the present optical disk drive apparatus.

As may be understood from FIGS. 3 and 5, each of the side portions 63, 63 of the tray 33 is provided with a guard rail 69 having an L-shaped cross section. The guard rail 69 is, for example, is comprised of a resin, such as polycarbonate, and it is formed along one edge thereof with a pair of reference projections 70, 70 and a pair of hooks 71, 71. The reference projections 70, 70 are fitted into reference holes formed in the side portions 63, 63 of the tray 33 and the hooks 71, 71 are deformed to have the guard rails 69, 69 fixedly attached to the respective side portions 63, 63 of the tray 33. These guard rails 69, 69 serve to guide both side edges of a cartridge when the cartridge is inserted into the tray 33, as will be described more in detail later. These guard rails 69, 69 have forwardly extending somewhat flared out portions, thereby facilitating the insertion of a cartridge into the tray 33. As also shown in FIG. 3, a pair of leaf springs 72, 72 is mounted on the top surface of the tray 33 each adjacent to and in parallel with the corresponding one of the side portions 63, 63 of the tray 33. Each of the leaf springs 72, 72 has a downwardly curved portion which serves to apply a downward pressing force to a cartridge when it has been inserted into the tray 33.

Figure 6:
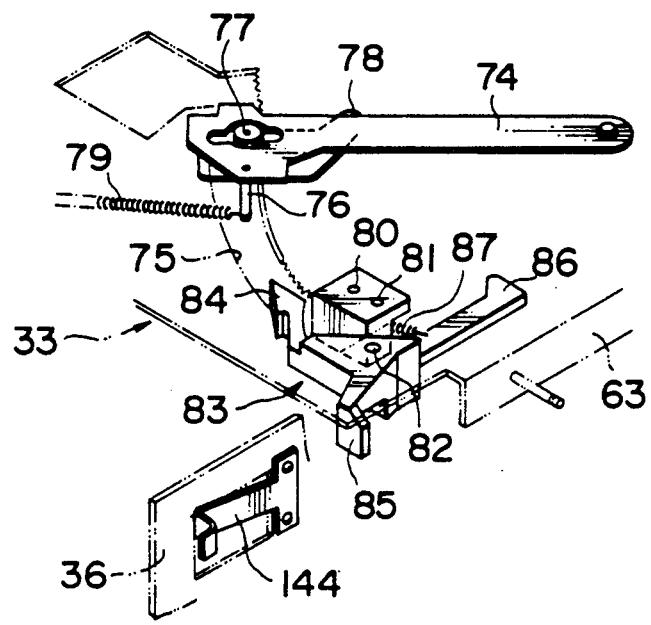
FIG. 6 is a schematic illustration showing a leaf spring latch provided in the present optical disk drive apparatus in connection with part of the tray.

As shown in FIG. 3, an eject arm 74 is provided on the top surface of the tray 33. The eject arm 74 has its one end pivotally connected to the tray 33 at a location close to the left-hand side portion 63. An arc-shaped slot 75 is formed in the top wall of the tray 33 in commensurate with the locus of pivotal movement of the tip end of the eject arm 74. As shown in FIG. 6, an eject shaft 76 is provided at the tip end of the eject arm 74 as extending through the arc-shaped slot 75, and a shutter opening and closing hook 78 is also mounted at the tip end of the eject arm 74 through an oil damper 77. And, there is provided an eject spring 79 which has its one end engaged with the eject shaft 76 and has its other end engaged with the right-hand side portion 63 of the tray 33, so that the eject arm 74 is given a tendency to pivot in the counterclockwise direction as viewing into FIG. 6. Thus, the tip end of the eject arm 74 is normally kept at that end of the arc-shaped slot 75 which is located near the center of the top wall of the tray 33. A media-in sensor 80 and an A/B side sensor 81 are mounted on the tray 33 at that end of the arc-shaped slot 75 which is adjacent to the left-hand side portion 63. As shown in FIG. 6, at the end of the arc-shaped slot 75 closer to the left-hand side portion 63 is also provided a latch 83 which is rotatable around a pin 82 planted in the tray 33. The latch 83 includes a latch hook portion 84, a latch release portion 85 and a latch cartridge holder portion 86, and the latch 83 has a tendency to rotate in the clockwise direction as viewing into FIG. 6 due to the provision of a latch tension spring 87, so that the latch hook portion 84 is normally located at that end of the arc-shaped slot 75 which is closer to the side portion 63 of the tray 33.

Figure 7:
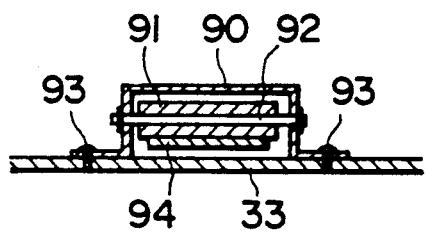
FIG. 7 is a fragmentary, cross sectional view showing a bracket mounted on the tray of the present optical disk drive apparatus.

As shown in FIG. 3, in the top wall of the tray 33 is formed with an elliptic opening 89 approximately at the center thereof, and a bracket 90 is mounted on the top wall of the tray 33 near the front end of the tray 33. As shown in FIG. 7, the bracket 90 is generally in the shape of an inverted-U and a collar shaft 92 is provided to extend through a cone collar 91 and also through the bracket 90 to support the cone collar 90 in position. The bracket 90 is fixedly attached to the top wall of the tray 33 by means of screws 93, 93 as shown in FIG. 7. It should also be noted that a cone arm 94 extends in the space between the cone collar 91 and the top wall of the tray 33 with the cone arm 94 in rolling contact with the cone collar 91 which in turn is supported to be rotatable around the collar shaft 92.

Figure 8:
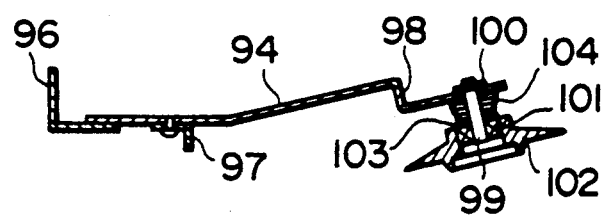
FIG. 8 is a cross-sectional, side view showing a cone arm provided in the present optical disk drive apparatus.

As shown in FIGS. 1 and 8, the cone arm 94 is generally of an elongated plate shape and its widened proximal end is connected to a leaf spring 96, for example, by spot welding. The leaf spring 96 has its one end fixedly attached to the cone arm 94 and has its other end bent upwardly at right angles. And an angle member 97 is fixedly attached to the cone arm 94 near the proximal end thereof with its portion extending downwardly. On the other hand, the distal end of the cone arm 94 is formed with a stepped portion 98 and a cone shaft 99 is provided to extend through the tip end portion of the cone arm 94. As shown in FIG. 8, an E-ring 100 is fixedly attached to the top end of the cone shaft 99 and a cone disk (pressure disk) 102 is mounted at the bottom end of the cone shaft 99 through a bearing 101 so that the cone disk 102 is supported to be rotatably around the cone shaft 99. The bearing 101 may be press-fitted into the cone disk 102, or it may also be inserted into the cone disk 102 by any other suitable means during manufacture of the cone disk 102. And, another E-ring 103 is fixedly attached to the cone shaft 99 to determine the position of the cone disk 102 on the cone shaft 99, and a cone spring 104 is provided between the cone arm 94 and the E-ring 103 so as to normally urge the cone disk 102 in the downward direction.

Figure 9:
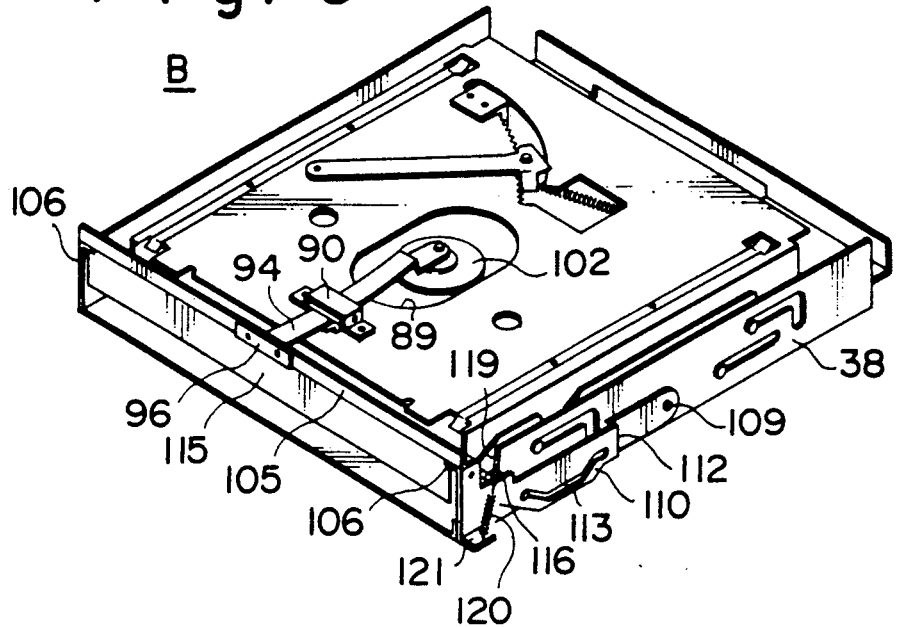
FIG. 9 is a perspective view showing the overall structure of a loading unit provided in the present optical disk drive apparatus.

As shown in FIG. 9, such a cone arm 94 is set in position such that the vertical portion of the L-shaped leaf spring 96 is passed under a bridge 105, located in front thereof and screwed onto the front surface of the bridge 105 at the center thereof. The bridge 105 has a generally L-shaped cross section, and, as shown in FIG. 1, the bridge 105 is fixedly attached to inwardly bent portions 106, 106 of the left and right side frames 36 and 38 of the frame 30 by means of screws. With this structure, the cone arm 94 is prevented from moving upwardly by the bracket 90 against the lifting springy force applied by the leaf spring 96, and, thus, as shown in FIG. 9, the cone arm 94 is set in position with the cone disk 102 mounted at the distal end thereof located properly in the elliptic opening 89 of the tray 33.

Figure 10A:
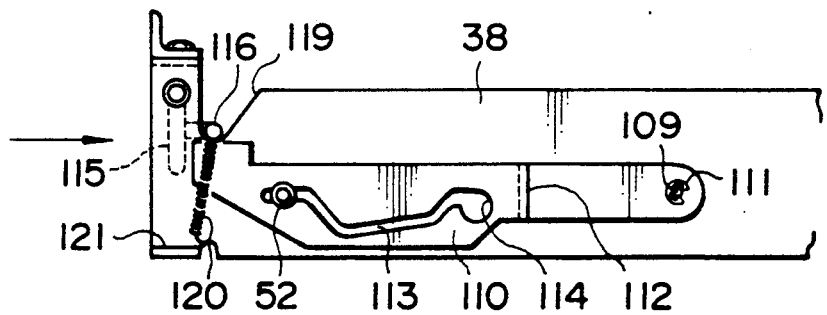
FIG. 10a is a schematic illustration showing a door opening and closing mechanism provided in the present optical disk drive apparatus with the door in a closed condition.
Figure 10B:
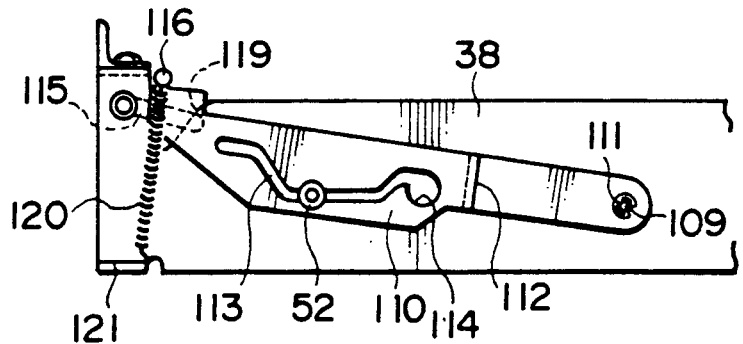
FIG. 10b is a schematic illustration showing the structure shown in FIG. 10a with the door in an open condition.

The loading unit B assembled as illustrated in FIG. 9 is provided with a door opening and closing mechanism shown in FIGS. 10a and 10b. That is, as also shown in FIG. 1, at the center of the right-hand side frame 38 of the frame 30 is planted a pin 109, to which one end of a door arm 110 is pivotally connected, and an E-ring 111 is fixedly attached to the pin 111 to prevent the door arm 110 from unintentionally slipping away from the pin 111. A stepped portion 112 is provided in the middle of the door arm 110 so that the front section of the door arm 110 is separated at a predetermined distance from the side frame 38, and a particularly profiled door arm slot 113 is formed. The door arm slot 113 is provided with a relief hole 114 at the end closer to the stepped portion 112, so that the grooved collar 52 may be fitted into the door arm slot 113 through this relief hole 114. As described before, the grooved collar 52 is mounted on the door arm drive pin 44 of the carrier 32. Thus, the door arm 110 is supported by the door arm drive pin 44 and the pin 109. An L-shaped angle member 116 of a door 115 is located at the free end of the door arm 110. The door 115 is elongated in shape sideways and plate shaped, and, as shown in FIG. 1, a pair of support shafts extend from both ends of the door 115 in opposite directions. Door collars 118, 118 are fitted onto the respective support shafts 117, 117 of the door 115 and the door collars 118, 118 are attached to the left and right side frames 36, 38 so that the door 115 is supported to be pivotal around the support shafts 117, 117. And, the before-mentioned L-shaped angle member 116 is provided to extend from the right-hand support shaft 117 of the door 115. The L-shaped angle member 116 has a first portion which extends rearwardly and a second portion which extends outwardly from the tip end of the first portion. Thus, the tip end of the L-shaped angle member 116 extends through a cut-way portion 119 of the right-hand side frame 38, and one end of a door spring 120 is engaged with the tip end of the L-shaped angle member 116. The other end of the door spring 120 is engaged with a projection 121 which is formed by bending part of the side frame 38 outwardly at the front bottom end thereof.

As shown in FIGS. 9 and 10a, normally the door 115 is held in its closed position with the L-shaped angle member 116 in abutment against the cut-away portion 119 of the left-hand side frame 38. However, when the carrier 32 moves rearwardly as will be described later, the grooved collar 52 located near the front end of the door arm slot 113 as shown in FIG. 10a also moves along the door arm slot 113 in the rearward direction, so that the door arm 110 moves in the clockwise direction around the pin 109 and the L-shaped angle member 116 is lifted upward or pivotally moved counterclockwise against the force of the door spring 120 at the front end of the door arm 110, thereby causing the door 115 to open, as shown in FIG. 10b.

As shown in FIGS. 1 and 2, the load drive system C of the above-described optical disk drive apparatus is disposed below the bottom wall of the frame 30 at its rear left corner. That is, a loading bracket 124 is mounted on the bottom surface of the frame 30 at the left side thereof, and a load drive motor 125 is mounted on the bracket 124 with the rotation of the motor 125 being transmitted to a pinion shaft 126 via a speed reduction mechanism. The pinion shaft 126 is supported vertically by the bracket 124 and its top end located above the frame 30 as extending therethrough. And, a drive pinion 127 is fixedly attached to the top end of the pinion shaft 126 so that the drive pinion 127 is so located to be in mesh with the rack 57 of the carrier 32. With this structure, the carrier 32 is caused to move by driving to rotate the load drive motor 125, thereby allowing to move the loading unit B.

Figure 11:
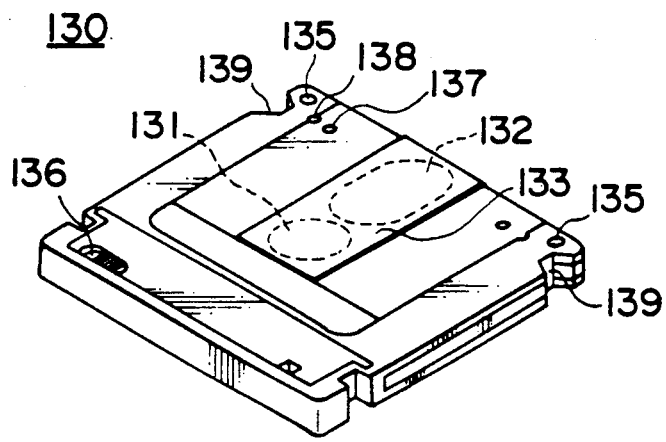
FIG. 11 is a perspective view showing the overall structure of a cartridge for use in the present optical disk drive apparatus.
Figure 12:
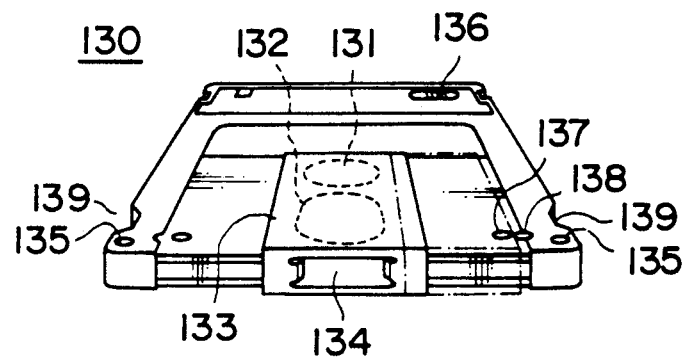
FIG. 12 is a perspective view showing the cartridge of FIG. 11 when viewed from the front end thereof.

Having described the structure of the present optical disk drive apparatus, a cartridge 130 shown in FIGS. 11 and 12 may be inserted into the present optical disk drive apparatus. As shown in FIGS. 11 and 12, the cartridge 130 houses therein a disk for storing thereon desired information, and the cartridge 130 is provided centrally with a disk clamp window 131 at top and bottom and also with a head window 132 near its front end at top and bottom. The cartridge 130 also includes a generally U-shaped shutter 133 which has a pair of parallel portions partly covering the top and bottom of the cartridge and a connecting portion connecting the parallel portions and located at the front end of the cartridge. The shutter 133 is provided to be slidably movable to the left or to the right of the cartridge and it is normally located at its central position to cover both of the windows 131 and 132 under the force of a spring, thereby permitting the disk from being damaged accidentally while handling. The shutter 133 is preferably comprised of stainless steel. The front end or connecting portion of the shutter 133 is formed with a shutter opening and closing window 134.

In addition, the cartridge 130 is provided with a pair of reference holes 135, 135 at opposite sides of the front end thereof. A write protect notch 136 is also provided, and a media-in detection hole 137 and an A/B side detection hole 138 are also provided side-by-side near the front end. Moreover, a pair of positioning recesses 139, 139 is provided at both of the opposite sides near the front end. The above-mentioned shutter 133, shutter opening and closing window 134, reference holes 135, 135, write protect notch 136, media-in detection hole 137, A/B side detection hole 138, and positioning recesses 139, 139 are provided on top and bottom surfaces of the cartridge 130 symmetrically.

Such a cartridge 130 as described above is inserted into the loading unit B as indicated by the arrow in FIG. 10a through an insertion opening 142 shown in FIG. 16. Then, the cartridge 130 moves the door 115 to its open position against the force of the door spring 120 so as to be received inside of the tray 33. In this case, the shutter opening and closing hook 78 shown in FIG. 6 comes into engagement with the shutter opening and closing window 134, and as the cartridge 130 is further pushed inside, the eject arm 74 comes to be pivotally moved against the force of the eject spring 79. The shutter 133 of the cartridge 130 is gradually moved to its open position by the shutter opening and closing hook 78 against the force of the spring. As the cartridge 130 is further pushed inwardly, the front end of the side surface of the cartridge 130 comes to push the latch cartridge holder portion 86, so that the latch 83 is pivotally moved in the clockwise direction as viewing into FIG. 6 against the force of the latch tension spring 87 around the pin 82. Then, the latch hook portion 84 is moved away from the arc-shaped slot 75, so that the eject shaft 76 can move past its hook position. Then, when the latch cartridge holder portion 86 comes into engagement with the positioning recess 139 of the cartridge 130, its engagement is maintained by the recovery force of the latch tension spring 87, thereby preventing the cartridge 130 from unintentionally moving away. At the same time, the latch 83 is caused to rotate in the counterclockwise direction as viewing into FIG. 6, so that the latch hook portion 84 comes into engagement with the eject shaft 76, thereby restraining the eject shaft 76 from returning to its initial position under the force of the spring 79.

Under this condition, the shutter 133 of the cartridge 130 covers the media-in detection hole 137 since it is located at the position indicated by the one-dotted line in FIG. 12, so that the media-in sensor 80 detects the media-in and shutter open condition. In response to this detection signal, the load drive system C is driven. In response to this detection signal, the load drive system C activates a load drive motor 125, thereby initiating a loading operation. Then, the carrier 32, together with the tray 33 housed therein, is moved in the horizontal direction by the drive pinion 127, so that the latch release portion 85 of the latch 83 mounted on the tray 33 comes into contact with a leaf spring latch 144 mounted at the front end portion of the left-hand side frame 36 of the frame 30, as shown in FIGS. 1 and 6. And, as the carrier 32 is further moved inwardly, the leaf spring latch 144 becomes resiliently deflected since the spring constant of the latch tension spring 87 is larger than the spring constant of the leaf spring latch 144, and, therefore, the latch release portion 85 moves past the leaf spring latch 144 while the eject shaft 76 is being retained by the latch hook portion 84, thereby permitting the cartridge 130 to be transported to a predetermined position. Furthermore, as the carrier 32 is moved further, the tray 33 comes to move vertically downward as guided by the L-shaped slots 40 of the frame 30 and the inclined slots 53 of the carrier 32. Accordingly, the reference holes 135, 135 of the cartridge 130 are brought into engagement with the respective stepped reference pins 41, 41 of the frame 30, thereby determining the position of the cartridge 130 in the horizontal direction and placing the cartridge 130 on the stepped reference pins 41, 41 and the unstepped reference pins 42, 42 and having the cartridge 130 pressed by the leaf springs 72, 72 to determine its position in the vertical direction.

Figure 13A:
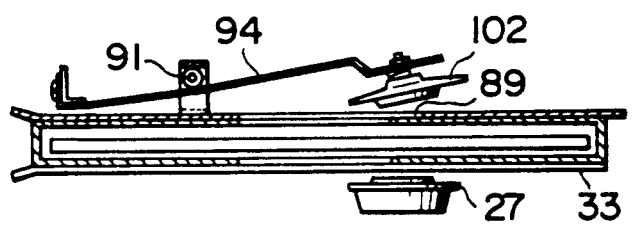
FIG. 13a is a schematic illustration showing the cone load mechanism provided in the present optical disk drive apparatus in a state before a cartridge is inserted.
Figure 13B:
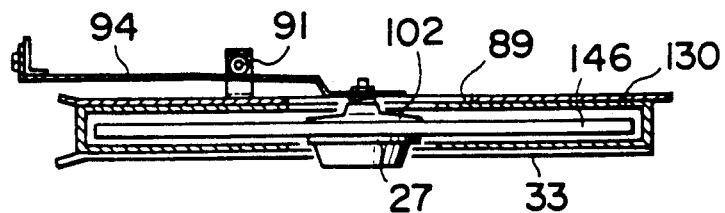
FIG. 13b is a schematic illustration showing the cone load mechanism of FIG. 13a in a state after a cartridge has been inserted.

Before the insertion of the cartridge 130, the cone arm 94 takes the position shown in FIG. 13a so that the cone disk 102 supported at the tip end of the cone arm 94 is not yet located inside of the tray 33 as extending through the elliptic opening 89. However, when the tray 33 moves, together with the carrier 32, the cone arm 94 gradually moves pivotally downwardly due to the horizontal movement of the tray 33, and, then, when the tray 33 moves vertically downward in the second mode of movement, the cone collar 91 also moves vertically downwardly, thereby locating the cone disk 102 at its lowermost position. In this case, the cone disk 102 supported at the tip end of the cone arm 94 moves through the elliptic opening 89 of the tray 33 and the disk clamp window 131 of the cartridge 130 to be pressed against the disk 146 housed in the cartridge 130, whereby the cone spring 104 is set in compression state to sandwich the disk 146 between the spindle cup 27 and the cone disk 102 under constant force, thereby permitting to transmit the rotational force provided by the spindle motor 23 to the disk 146. Under this condition, using the optical pick-up 24 shown in FIG. 1, information can be written on or read from the optical disk 146 through the head window 132 of the cartridge 130. In this case, double insertion of cartridges 130 is prevented by the angle member 97 mounted on the cone arm 94.

Before the insertion of the cartridge 130, the grooved collar 52 is located closer to the front end of the door arm slot 113 and the door arm 110 is located at the position shown in FIGS. 9 and 10a, so that the door 115 is under the force of the door spring 120 to keep the L-shaped angle member 116 in abutment against the cut-away portion 119 of the left-hand side frame 38, and, thus, the door 115 is maintained at its closed position. Under this condition, the cartridge 130 may be inserted against the force of the door spring 120. However, when the cartridge 130 is inserted into the tray 33 and the carrier 32 is moved as described above, the grooved collar 52 also moves along the door arm slot 113 along therewith, thereby pivotally moving the door arm 110 as indicated in FIG. 10b. As a result, the L-shaped angle member 116 is lifted upward or rotated counterclockwise against the force of the door spring 120, and the door 115 is maintained at its open position. However, when the carrier 32 has been moved to its end position, the grooved collar 52 reaches the opposite end of the door arm slot 113, so that, depending on a particular shape of the door arm slot 113, the door arm 110 returns to the position shown in FIGS. 9 and 10a, whereby the door 115 is set in its closed position again.

On the other hand, in the case where the cartridge 130 now installed in the present optical disk drive apparatus is to be removed, the load drive motor 125 is driven in the reversed direction, for example, by depressing an eject button, which is not shown. And, thus, the door arm 110 is lifted to set the door 115 open, and, at the same time, the carrier 32, together with the tray 33, is moved upward, and, thereafter, moved in the horizontal direction. In this case, the force of the leaf spring latch 144 overwhelms the force of the latch tension spring 87 and the leaf spring latch 144 comes into engagement with the latch release portion 85 to move the latch 83 pivotally. Then, the latch hook portion 84 releases the holding state of the eject shaft 6, and, thus, the eject arm 74 is caused to pivotally move by the eject spring 79, so that the cartridge 130 is discharged or ejected through the insertion opening 142 shown in FIG. 16. And, the tray 33, together with the carrier 32, returns to the original position to complete the entire operation.

In the above-described optical disk drive apparatus, after having the eject arm 74 retained by the latch 83 by insertion of the cartridge 130, even if the cartridge 130 is pulled out, the leading edge of the cartridge 130 pushes the latch cartridge holder portion 86 while the cartridge 130 is being pulled out, whereby the latch 83 is pivotally moved to have the latch hook portion 84 disengaged from the eject shaft 76 at the tip end of the eject arm 74, so that there is no danger of damaging any parts of the apparatus.

As shown in FIG. 1, the bottom wall of the frame 30 is formed with an elongated slot 148 with its longitudinal direction in parallel with the direction of movement of the carrier 32, and a home sensor 149 and an end sensor 150 are mounted on the bottom surface of the bottom wall of the frame 30 located at the front and rear ends of the elongated slot 148, respectively. These sensors 149 and 150 are used to detect the home end shutter 58 of the carrier 32 shown in FIG. 3, thereby detecting the home and end positions of the carrier 32. In response to these detection signals, the load drive motor 125 is driven to rotate either in the normal direction or in the reversed direction, thereby permitting to insert or eject the cartridge 130.

Figure 14A:
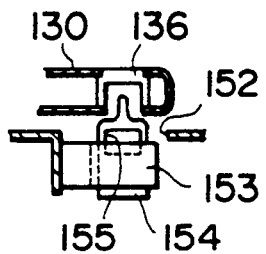
FIG. 14a is a schematic illustration showing a write protect mechanism provided in the present optical disk drive apparatus when viewed in a front to rear direction.
Figure 14B:
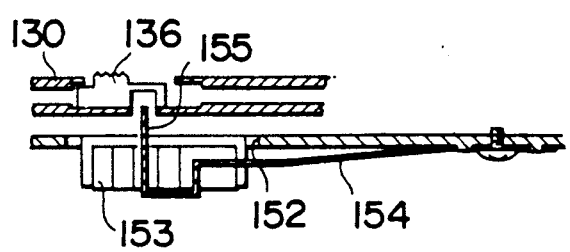
FIG. 14b is a schematic illustration showing the write protect mechanism of FIG. 14a when viewed in a left to right direction.

Furthermore, as shown in FIG. 1, the bottom wall of the frame 30 is formed with a detection window 152 at the left front corner, and a write protect sensor 153 is mounted on the bottom surface of the bottom wall of the frame 30 so as to have part of the write protect sensor 153 project into the detection window 152. And, as shown in FIGS. 14a and 14b, there is also provided a leaf spring write protect member 154 whose tip end extends through the sensor 153, and, as shown in FIG. 1, the leaf spring write protect member 154 extends sideways and is located at the front end of the apparatus with the proximal end thereof being fixedly attached to the bottom wall of the frame 30. As shown in FIGS. 14a and 14b, if the write protect notch 136 of the cartridge 130 is not in alignment with the leaf spring write protect member 154, the sensor 153 is interrupted by the leaf spring write protect member 154, thereby permitting to write information on the optical disk 146. On the other hand, if the write protect notch 136 of the cartridge 130 is shifted, thereby causing the leaf spring write protect member 154 to move downwardly, the window 155 of the write protect member 154 moves downwardly, so that the interrupted state of the write protect sensor 153 is removed, thereby prohibiting to write information on the optical disk 146.

Figure 15A:
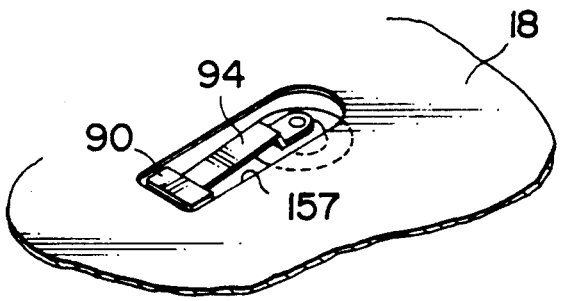
FIG. 15a is a schematic illustration showing in a perspective view a relief hole formed in the drive control board provided in the present optical disk drive apparatus.
Figure 15B:
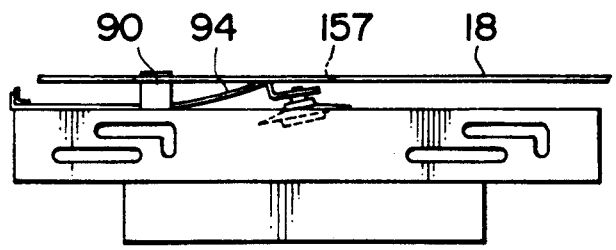

As shown in FIGS. 15a and 15b, in the illustrated optical disk drive apparatus, a relief opening 157 is formed at the center of the drive control board 18 in registry with the cone arm 94 and the bracket 90, thereby permitting the drive control board 18 to be located closer to the tray 33, so that the overall apparatus can be made compact in size.

Figure 19:
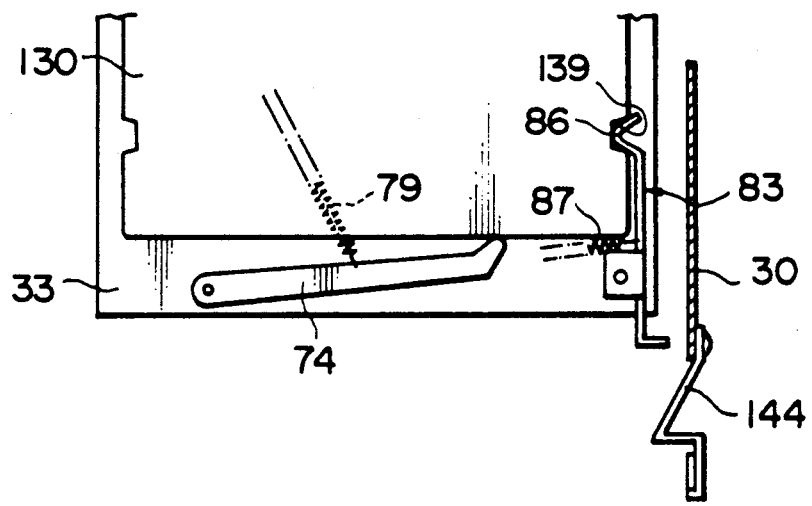
FIGS. 19 and 20 are schematic illustrations showing another embodiment of the present invention.

In the above-described embodiment, it is so structured that the shutter 133 of the cartridge 130 is opened by the eject arm 74 and the latch 83 and the cartridge 130 is retained, and upon completion of writing information on the optical disk 146, the latch 83 is pivotally moved by the leaf spring latch 144 to release the retaining condition, thereby permitting the cartridge 130 to be ejected. Alternatively, it may also be so structured as shown in FIG. 19. That is, the pivot of an eject arm 74 is located at one side of a tray 33 near the front end, and an eject arm 74 is provided with a tendency to pivotally move counterclockwise by an eject spring 79, so that a cartridge 130 normally receives a biasing force in the ejection direction when inserted. In addition, there is provided a latch 83 which is pivotally connected to the tray 33 at one side of the rear end of the tray 33, and a latch tension spring 87 has its one end connected to the latch 83. Thus, when the cartridge 130 is inserted, a latch cartridge holder portion 86 at the tip end of the latch 83 comes into engagement with the positioning recess 139 of the cartridge 130. Upon completion of write or read, similarly with the previously described embodiment, the latch 83 is pivotally moved by the leaf spring latch member 144 mounted on the frame 30, and, thus, the cartridge 130 is ejected by the eject arm 74.

Figure 20:
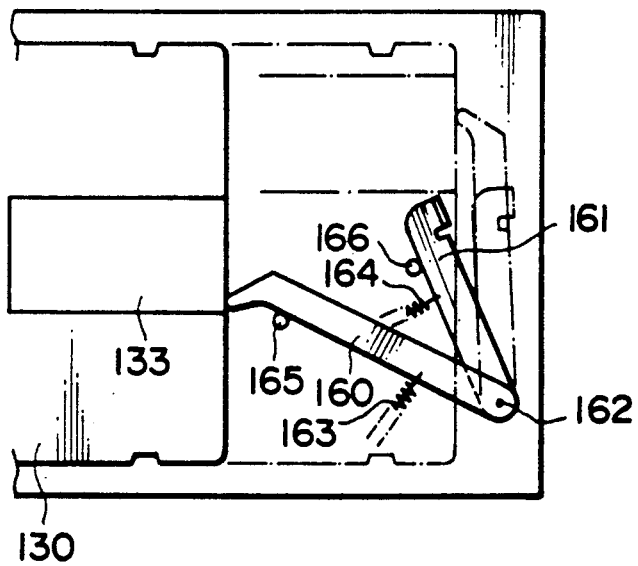

Moreover, in the above-described embodiment, the eject arm 74 is used not only to open the shutter 133 of the cartridge 130, but also to eject the cartridge 130. However, as shown in FIG. 20, it may also be so structured that a shutter open lever 160 for opening the shutter 133 of the cartridge 130 and an eject lever 161 for ejecting the cartridge 130 are separately provided as commonly pivoted at a common pivot 162. In this case, springs 163 and 164 are separately provided as connected to the levers 160 and 161, respectively, and these levers 160 and 161 are kept in engagement with stopper pins 165 and 166 planted in the cartridge 130, respectively. With this structure, when the cartridge 130 is inserted, the stopper pin 165 first comes into engagement with the longer shutter open level 160, thereby causing the shutter open lever 160 to pivotally move clockwise as viewing into FIG. 20 against the force of the spring 163, so that the shutter 133 is gradually moved toward its open position. In the meantime, the other stopper pin 166 eventually comes into engagement with the eject lever 161 to cause the eject lever 161 to pivotally move clockwise, together with the shutter open lever 160, against the force of the spring 164. And, although not shown, due to a latch mechanism similar to that described with respect to the previous embodiment, the cartridge 130 is held in position as indicated by the one-dotted line in FIG. 20. Of course, under the condition, the shutter 133 has been moved to its open position to establish a fully open condition.

Figure 21:
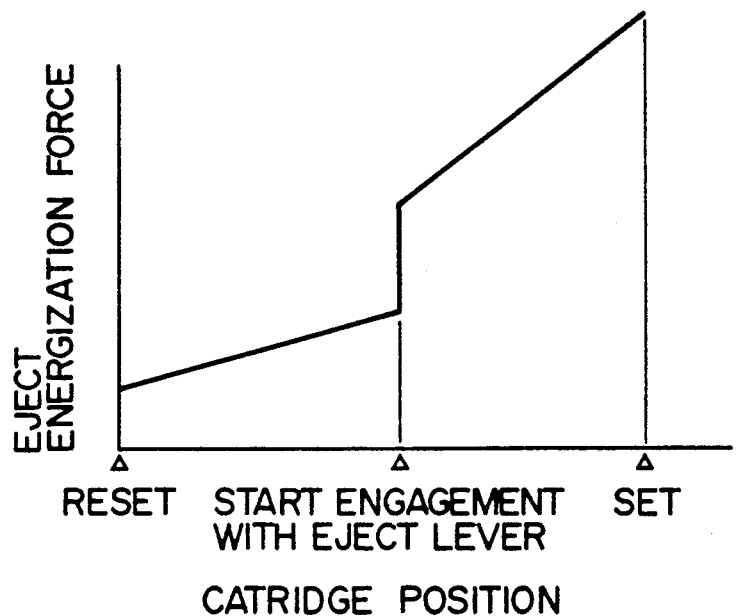
FIG. 21 is a graph showing the relation between the discharge (ejection) energization force and the cartridge position of the structure shown in FIG. 20.
Figure 22:
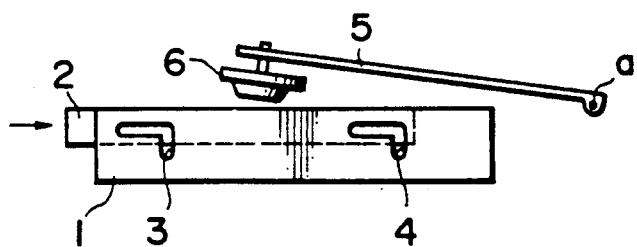
FIGS. 22, 23a, 23b, and 24 are schematic illustrations showing the prior art structures.
Figure 23A:
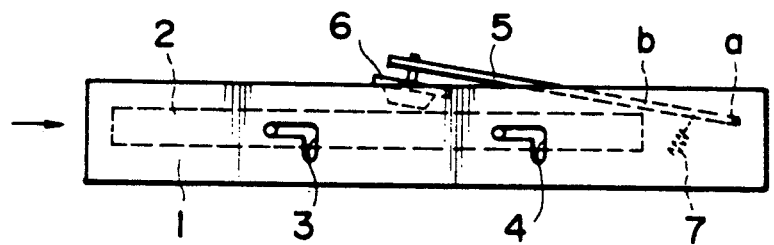
Figure 23B:
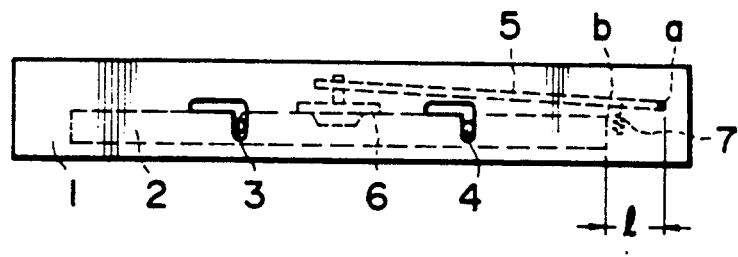
Figure 24:
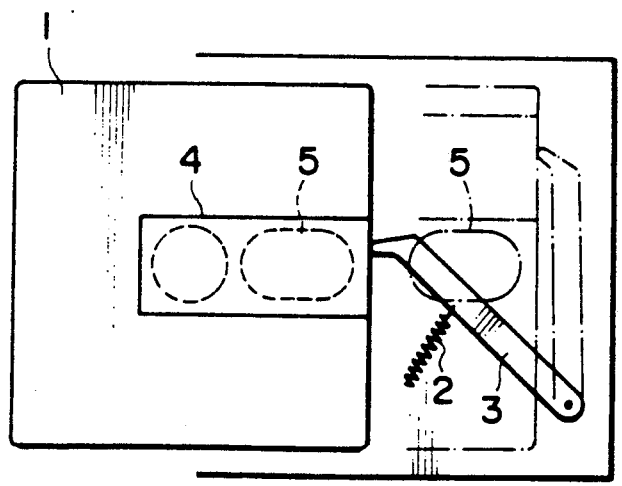

With this structure, the relationship between the location of the cartridge 130 being inserted and the ejection force applied to the cartridge 130 is as graphically shown in FIG. 21. As shown in FIG. 21, it is so set that the eject force applied to the cartridge 130 is lower than an eject load of the cartridge 130 before engagement with the eject lever 161, but higher after engagement with the eject lever 161. With such a structure, when ejecting the cartridge 130, the cartridge 130 stops as soon as it parts with the eject lever 161, and, thereafter, when the cartridge 130 is manually pulled out, the shutter open lever 160 returns to the original position under the force of the spring 163, thereby moving the shutter 133 to its closed position. Therefore, with this structure, irrespective of the stroke of the shutter open lever 160, the amount of ejection of the cartridge 130 can be determined freely and the fluctuations in the ejected position of the cartridge 130 can be eliminated. In addition, since the shutter open lever 160 and the eject lever 161 are supported at the common pivot 162, there is an added advantage of possibility to minimize the required layout space. As a further alternative, it may also be so structured that the cartridge 130 does not come into direct engagement with the shutter open lever 161, and, when the shutter open lever 161 has pivotally moved over a predetermined angle, the shutter open lever 160 comes into engagement with the eject lever 161, whereby both of the levers 160 and 161 pivotally move in unison thereafter. With this alternative structure, the cartridge 130 engages only with the leading edge of the shutter open lever 160, so that wobbling of the cartridge 130 can be minimized.

In accordance with the present invention, since there is no need to provide a separate motor for pivotally moving the cone arm to hold the optical disk in position, the number of parts can be minimized and thus there is obtained a reduction in cost. Moreover, since the cone arm is moved pivotally downwardly even if the tray moves in the horizontal direction, and the cone arm is positively moved pivotally downwardly or upwardly at the position away from the pivoted position, the level of force required to pivotally move the cone arm is minimized. In addition, the angle of pivotal movement of the corn arm is minimized, so that the overall structure can be made smaller. Furthermore, in accordance with another aspect of the present invention, there is provided a latch release portion for releasing the latching condition in association with the movement of the tray for ejecting the optical disk or the cartridge housing therein the optical disk, so that the latch does not become unlatched even if the tray is moved vertically during setting of the optical disk or the cartridge. Thus, the optical disk or the cartridge can be positioned with ease and can be mounted on the spindle motor accurately. Furthermore, in accordance with a further aspect of the present invention, there are provided a shutter open lever for opening and closing the shutter of a cartridge and an eject lever for ejecting a cartridge separately, so that the cartridge can be ejected by the eject lever independently of the stroke of the shutter open lever. Thus, the amount of ejection of the cartridge can be determined arbitrarily and minimized, and, moreover, fluctuations in the position of ejection of the cartridge can be eliminated. In accordance with a still further aspect of the present invention, a relief opening for the cone arm or the like is provided in the drive control board, so that the drive control board can be arranged closer to the tray, which also contributes to make the entire apparatus further compact, in particular ever more flattened, in size.

While the above provides a full and complete disclosure of the preferred embodiments of the present invention, various modifications, alternate constructions and equivalents may be employed without departing the true spirit and scope of the invention. Therefore, the above description and illustration should not be construed as limiting the scope of the invention, which is defined by the appended claims.

What is claimed is:

1. A disk drive apparatus comprising a tray (33) for receiving a disk device (130) loaded at a predetermined position therein, a movable eject arm (74) which is secured to said tray (33) and engages said disk device (130) loaded at said predetermined position in said tray (33), said disk device (130) having a movable shutter (133), said eject arm (74) being biased to exert an ejecting force on said disk device (130) loaded at said predetermined position in said tray (33), discharging means selectively permitting said disk device to be movable from said predetermined position in said tray under the biasing force exerted by said eject arm, a shutter opening and closing member (78) engaging and opening said movable shutter (133) of the disk device (130) as the disk device is being loaded at said predetermined position in said tray, and a damping mechanism (77) through which said shutter opening and closing member (78) is coupled to said movable eject arm (74).

2. A disk drive apparatus as in claim 1 in which said disk device comprises a disk cartridge containing a disk.

3. A disk drive apparatus as in claim 1 in which said disk device comprises a disk.

4. A disk drive apparatus as in claim 1 in which said damping mechanism comprises an oil damper.

* * * * *